United States Patent [19]

Fenstermaker

[11] 4,327,809
[45] May 4, 1982

[54] BATTERY TRAY

[75] Inventor: Michael Fenstermaker, Lynwood, Calif.

[73] Assignee: Orion Industries, Inc., Compton, Calif.

[21] Appl. No.: 49,394

[22] Filed: Jun. 18, 1979

[51] Int. Cl.³ .............................................. B62D 25/00
[52] U.S. Cl. .................................. 180/68.5; 206/335;
248/300; 248/503; 248/558
[58] Field of Search .............. 180/68.5, 65 R; 280/37,
280/152 A, 152 R; 105/50, 51; 429/100;
248/300, 503, 558; 206/335

[56]         References Cited
       U.S. PATENT DOCUMENTS

| 2,748,459 | 6/1956 | Orr | 248/287 X |
| 2,947,373 | 8/1960 | Wilson | 180/68.5 |
| 3,106,375 | 10/1963 | Donaldson | 248/300 X |
| 3,704,761 | 12/1972 | Barrett, Jr. | 180/68.5 |
| 3,866,704 | 2/1975 | Bowers | 248/503 |

FOREIGN PATENT DOCUMENTS

| 649880 | 10/1962 | Canada | 180/68.5 R |
| 2828477 | 1/1980 | Fed. Rep. of Germany | 248/558 |
| 340035 | 9/1959 | Switzerland | 248/558 |
| 131817 | 9/1919 | United Kingdom | 429/100 |
| 418849 | 11/1934 | United Kingdom | 180/68.5 |
| 971616 | 9/1964 | United Kingdom | 180/68.5 |

Primary Examiner—Richard A. Bertsch
Assistant Examiner—Donald W. Underwood
Attorney, Agent, or Firm—Fulwider, Patton, Rieber, Lee & Utecht

[57]            ABSTRACT

A battery tray for an automotive vehicle is constructed for use as a replacement item and is adapted to receive the great majority of commercially available lead storage batteries. The battery tray is constructed with a rectangular floor bounded by edge retainers and with three spaced sunken wells arranged along the length of the floor. A pair of spaced apart elongated slots are defined in each of the end wells parallel to the longer floor sides and a circular aperture is defined therebetween. At least one elongated transverse slot is defined in the center well.

7 Claims, 7 Drawing Figures

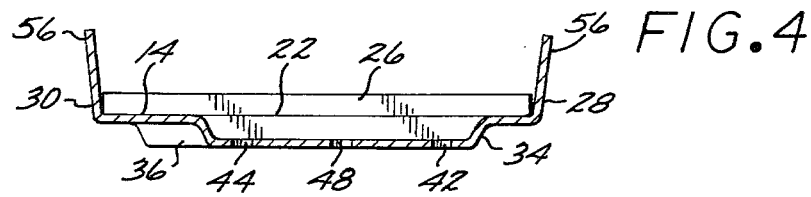
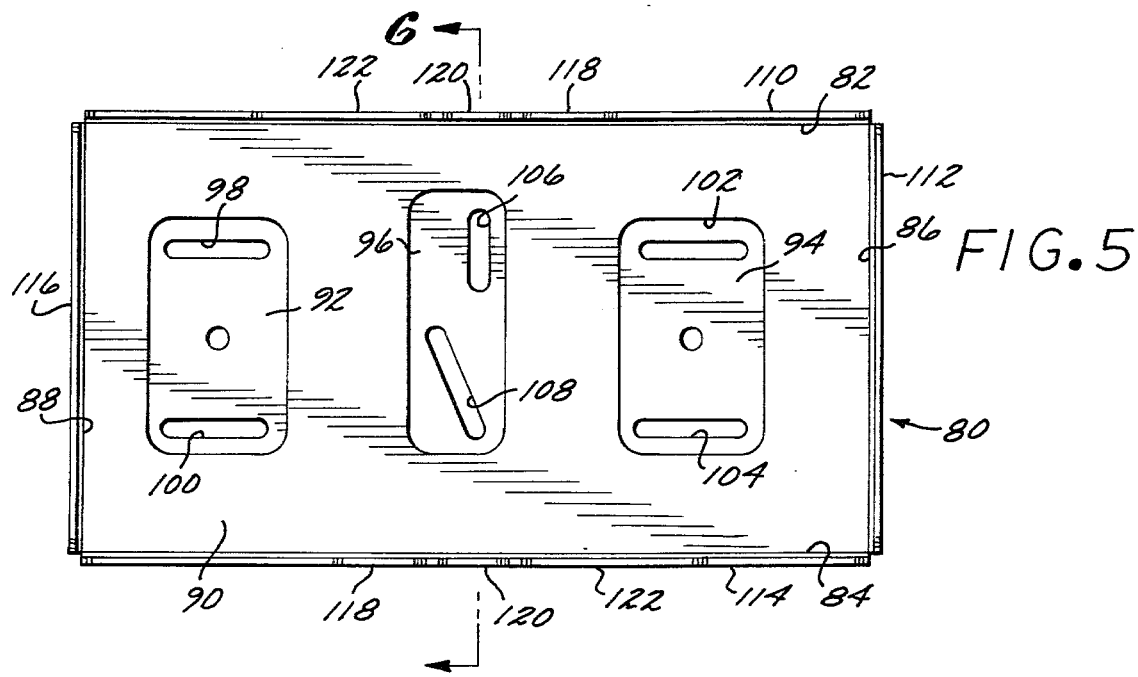
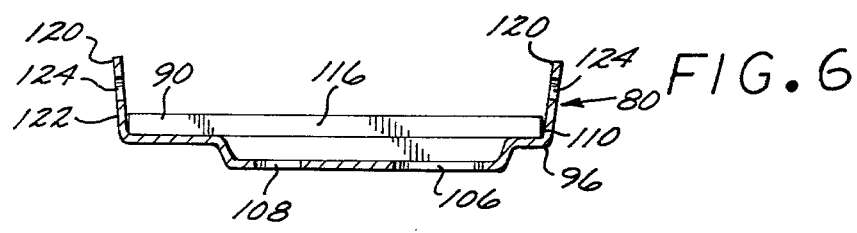
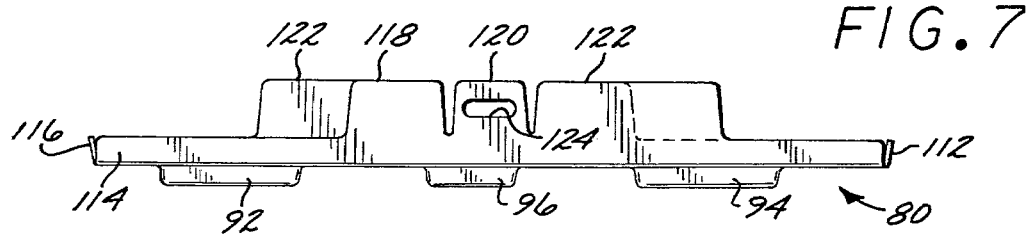

BATTERY TRAY

BACKGROUND OF THE INVENTION

1. Field of the Invention

The present invention relates to battery trays for mounting electrical storage batteries in automotive vehicles.

2. Description of the Prior Art

Battery trays for mounting electrical storage batteries in automotive vehicles have long been provided as original equipment on automotive vehicles. When battery replacement is required, a battery hold down device that secures a battery on the vehicle battery tray is loosened and the battery is removed and replaced. However, heretofore no suitable replacement battery tray has been available for replacing the battery tray originally installed at the time of manufacture of the automotive vehicle. As a consequence, replacement batteries installed in the old, corroded trays, have been subjected to a reduced life expectancy.

The original equipment battery trays, while initially quite serviceable, tend to deteriorate along with the original battery provided with the automotive vehicle. That is, acid spills and electro-chemical action cause structural deterioration of the battery tray originally provided with the automotive vehicle. Quite frequently the hold down bolts used to fasten the battery tray to the vehicle frame are either themselves corroded, or the metal of the battery tray adjacent thereto becomes corroded. In either event, the deterioration and weakening of the metal involved allows the battery tray to shift and move relative to the vehicle frame. This contributes significantly to jarring and jostling of a battery fastened therein as the vehicle moves. Such movement increases the probablity and degree to which solid matter in the acid compartments of the battery cells forms bridges across adjacent plates in the cells.

As a battery is used, a certain amount of metallic flaking occurs within the cells of a lead storage battery as the acid attacks impurities in the lead and lead oxide plates. Because of the ionic nature of the electrolytic solution in the lead storage cells, the accumulation of solid material that settles to the bottom of the storage cells tends to arrange itself in continuous paths of electrical communication between adjacent plates in the cells. Once such paths or bridges are created they form short circuits and produce "dead" battery cells. Once such a defect occurs, the battery must again be replaced. While this phenomena tends to occur at a relatively slow rate through normal battery usage, this deteriorative process is accelerated markedly by jostling and rocking of the battery within the vehicle. While virtually all automotive vehicles include at least some form of shock absorbing and cushioning equipment to insulate the vehicle frame from road shocks, a poor attachment of the battery tray to the vehicle frame will magnify the extent of sharp movement of the battery relative to the frame.

While the battery trays supplied as original equipment in the construction of an automotive vehicle are originally tightly secured to the vehicle frame, the security of attachment is degraded by the chemical activity that acts upon the battery tray and eminates from the battery itself in the manner previously described.

SUMMARY OF THE INVENTION

A principal object of the present invention is to provide a battery tray which can be utilized as a replacement item for original, factory installed battery trays, and which is adaptable to virtually any commercially available vehicle and virtually any commercially available lead storage battery for automotive vehicles currently in use. This versatility is achieved by the unique structure of the floor of the battery tray of the invention. The battery tray floor is rectangularly shaped and is of a size adapted to receive lead storage batteries currently available commercially. The battery tray floor is solid to protect the underside of the battery from beneath, but includes three shallow, recessed wells arranged longitudinally along the length of the floor of the battery tray. A series of specially configured slots and apertures are formed in the battery tray wells to receive fastening bolts that are used to attach battery trays to commercially available automotive vehicles. The particular configuration of these slots and apertures within the wells in the battery tray floor provides the high degree of versatility characteristic of the device of the present invention.

Because the geometry of the battery tray floor is of such great significance to the versatility of the battery tray of the invention, the invention can be described with greatest clarity and particularly by reference to the accompanying drawings.

DESCRIPTION OF THE DRAWINGS

FIG. 4 is a sectional view taken along the lines 4—4 of FIG. 2.

FIG. 5 is a plan view of an alternative embodiment of the invention.

FIG. 6 is a sectional view taken along the lines 6—6 of FIG. 5.

FIG. 7 is a side elevational view of the embodiment of FIG. 5.

DESCRIPTION OF THE EMBODIMENTS

Figure 1:
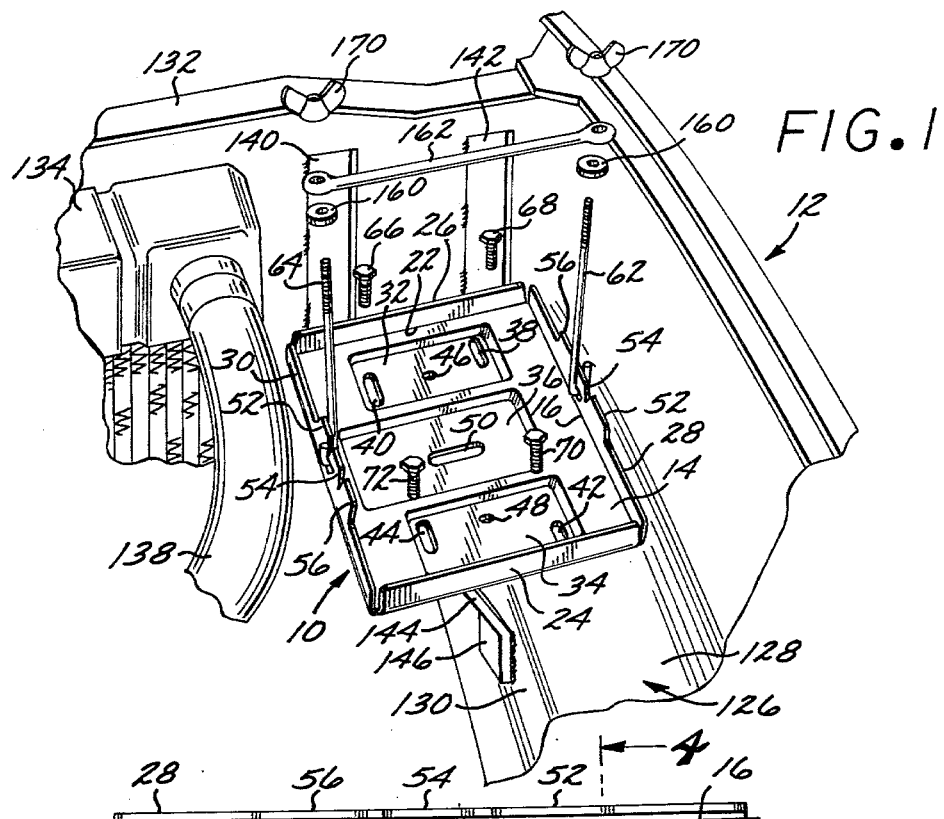
FIG. 1 is a perspective view of one embodiment of the battery tray of the invention installed in an automotive vehicle.
Figure 2:
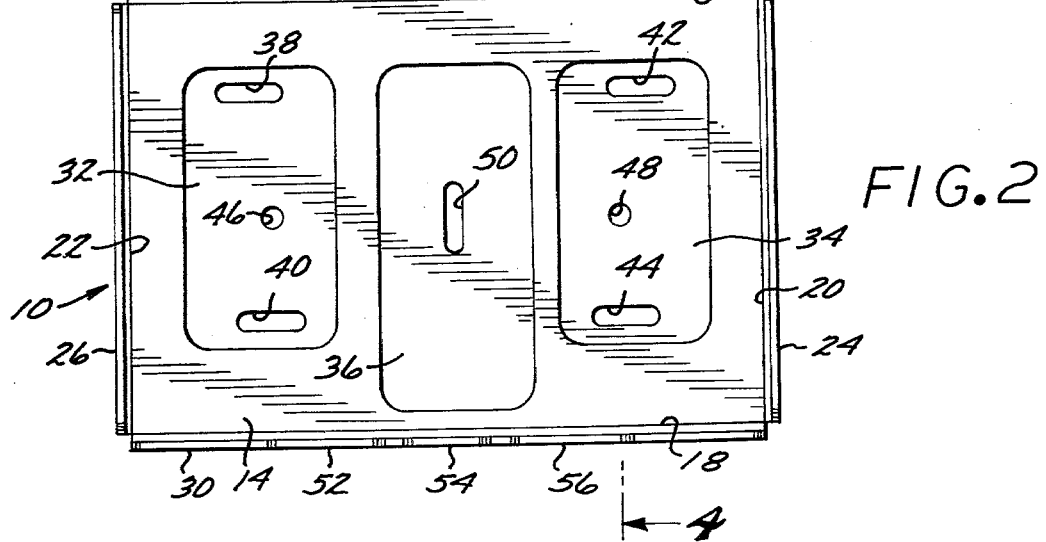
FIG. 2 is a plan view of the battery tray of FIG. 1.

With reference to FIG. 1, a battery tray 10 is depicted installed beneath the hood of an automobile 12 in the passenger side adjacent the front fender area thereof. The battery tray 10 is formed of 16 gauge cold rolled steel, approximately 1.519 millimeters in thickness. The battery tray 10 is depicted in detail in FIGS. 2, 3 and 4, and includes a solid rectangular floor 14 bounded about its edges by longer sides 16 and 18 and shorter sides 20 and 22. The battery tray 10 includes upwardly directed lips 24–30 that curve upwardly from the floor 14 to form a retainer about the perimeter thereof. The floor 14 is contoured to form two recessed shallow transversely oriented end wells 32 and 34 of generally rectangular shape with rounded corners at its perimeter as depicted in FIG. 2. The battery tray floor 14 is also formed with a shallow recessed center well 36, also of generally rectangular shape and with rounded corners, but somewhat longer than the end wells 32 and 34. The wells 32–36 are spaced longitudinally along the length of the battery tray 10 along the floor 14 and in alignment along the longer dimension thereof, which is the distance between the shorter sides 20 and 22. A pair of elongated slots 38, 40 and 42, 44 are defined in each of the end wells parallel to the longer floor sides 16 and 18 and transversely spaced from each other widthwise relative to the floor 14 and across the length of the end wells 32 and 34. Circular apertures 46 and 48 are also defined in the end wells 32 and 34 between the corresponding oblong slots 38, 40 and 42, 44 respectively.

Figure 3:
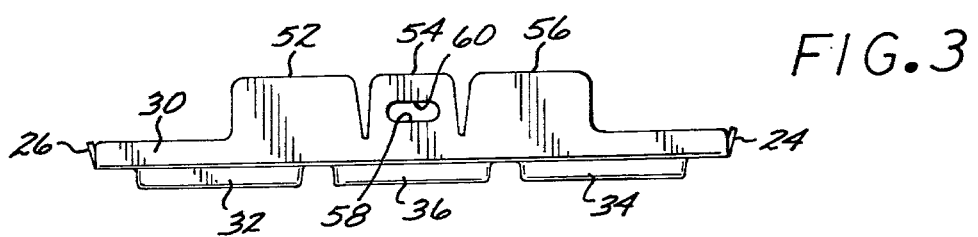
FIG. 3 is a side elevational view of the battery tray of FIG. 1.

In the center well 36 at least one elongated oblong transverse slot 50 is defined. As depicted in FIG. 3, the retaining lips 28 and 30, formed along the longer sides 16 and 18 of the floor 14 each include three upwardly directed tabs 52, 54 and 56. Horizontally disposed oblong slots 58 are defined in the center tabs 54 with the downwardly facing surfaces 60 thereof forming bearing ledges adapt to receive and secure upright fastening poles 62 and 64 in the manner depicted in FIG. 1.

The geometry of the slots and apertures in the wells 32–36 of the battery tray 10 are quite important. The geometric configuration depicted of slots and apertures is arranged so as to align with the battery tray bolts, studs and other fasteners of as many commercially available automotive vehicles as possible. Proper placement of the slots and apertures is necessary in order to achieve the full versatility demanded of a battery tray according to the invention.

In the embodiment of FIGS. 2–4, the longer sides 16 and 18 of the floor 14 are approximately 275.59 millimeters long and the shorter sides 20 and 22 of the floor 14 are approximately 143.33 millimeters long. The slots 38 and 42 in the end wells 32 and 34 respectively are located approximately 38.1 millimeters from one of the longer sides 16 of the floor 14. The slots 40 and 44 are located approximately 134.62 millimeters from the same side 16. The circular apertures 46 and 48 are located approximately 92.71 millimeters from the side 16. The foregoing distances are indicative of lateral separation between the longer side 16 and the closest edge or demarkation of the slots and apertures involved.

The oblong slot 50 in the center well 36 lies in perpendicular alignment relative to the longer sides 16 and 18 and is centered approximately 92.71 millimeters from the side 16 and approximately 137.92 millimeters from the shorter side 22, as depicted in FIG. 2.

It should be noted that the slots 38 and 40 are longitudinally offset from each other within the end well 32, as are the slots 42 and 44 in the end well 34. The end of the slot 38 closest to the shorter side 22 of the floor 14 terminates about 31.62 millimeters therefrom. Similarly, the closest end of the slot 42 terminates the same distance from the short side 20 of the floor 14. The closest ends of the slots 40 and 44 terminate about 46.9 millimeters from the shorter sides 22 and 20 respectively. The apertures 46 and 48 are 12.7 millimeters in diameter and the closest edges thereof are located approximately 64.77 millimeters from the shorter sides 22 and 20 respectively. The slots 38–44 are about 10.02 millimeters long overall, and include extremities rounded at an 8.89 millimeter diameter.

With reference to FIG. 3, the upper extremities of the tabs 52–56 lie a distance of 38.1 millimeters above the undersurface 62 of the floor 14. The undersurfaces of the wells 32–36 are recessed approximately 8.13 milimeters below the surface 62. The depth of the wells 32–36 is thereby sufficient to accomodate the heads of bolts 66–72, depicted in FIG. 1, within the wells 32–36 so that they do not protrude above the upper surface of the floor 14. A battery can then be placed directly on the flat portion of the surface of the floor 14, with the heads of the bolts 66–72 encompassed therebeneath in the contoured wells 32–36. The hooks at the lower extremities of the fastening poles 62 and 64 can be inserted through horizontal, elongated slots 58 to extend upward in the manner depicted in FIG. 1. Once a new replacement battery is in position atop the floor 14, the mounting poles 62 and 64 are pulled upward so that the hooks at their lower extremities firmly engage the downwardly disposed bearing ledges 60 in the fastening tabs 54.

An alternative embodiment of a battery tray 80 according to the present invention is depicted in FIGS. 5–7. The battery tray 80 is similar in many respects to the embodiment depicted in FIGS. 2–4. The battery tray 80 includes longer sides 82 and 84 and shorter sides 86 and 88 that delineate a rectangular floor 90. The longer sides 82 and 84 are approximately 337.82 millimeters long while the shorter sides 86 and 88 are approximately 184.15 millimeters long. The battery tray 80 also includes sunken generally rectangular shaped end wells 92 and 94, and a longer, narrower center well 96, all spaced longitudinally along the longer dimension of the battery tray 80 and running transverse to the longer dimension. Oblong narrow slots 98 and 100 are defined in the end well 92 parallel to the longer sides 82 and 84 of the floor 90, and longitudinally aligned with each other. That is, the slots 98 and 100 are of equal length, about 46.99 millimeters overall, and terminate at their closest extremities about 36.2 millimeters from the shorter side 88. The corresponding slots 102 and 104 in the end well 94 are also parallel to the longer sides 82 and 84 and in longitudinal alignment with each other, being about 52.71 millimeters at their closest extremities from the shorter side 86 of the floor 90.

Two transverse slots 106 and 108 are defined in the center well 96. The slot 106 lies in perpendicular alignment to the longer sides 82 and 84 of the floor 90 and extends a distance of about 34.29 millimeters overall. At its closest extremity, the slot 106 approaches to within approximately 24.77 millimeters of the longer side 82 and is approximately longitudinally centered between the shorter sides 86 and 88. The other slot 108 in the center well 96 is also elongated with rounded ends, and lies at an angle of approximately 16.75 degrees with respect to a perpendicular extending between the longer sides 82 and 84 of the floor 90. The ends of all of the slots 98–108 are rounded in a circular curvature having a diameter of about 8.89 millimeters. The center of curvature of the end of the slot 108 closest to the longer wall 84 is in longitudinal alignment between the shorter walls 86 and 88 even with the center of the slot 106. From this alignment, the slot 108 angles toward the longer wall 82 and at an inclination toward the shorter wall 88. The center of curvature of the end of the slot 108 closest to the longer wall 84 is approximately 131.06 millimeters from the longer side 82, and as previously noted, is centered midway between the walls 86 and 88 in alignment with the other center well slot 106.

As with the embodiment of FIGS. 2–4, the battery tray 80 includes upstanding tabs extending about the surrounding lips 110–116 that bound the perimeter of the floor 90. Three tabs 118, 120 and 122 extend upwardly from the longer side lips 110 and 114. One of the endmost tabs 118 is shorter, while the other end tab 122 is longer. The center tabs 120 are perforated by elongated horizontal slots 124 which are adaptive to receive fastening poles 62 and 64, similar to the slots 58 in the center tabs 54 of the embodiment of FIG. 3.

With reference to FIG. 1, the automobile 12 includes an engine compartment defined by a frame 126. Near the front of the automobile vehicle a radiator guard 132 protects a conventional automobile radiator 134 which has a hose 138 leading rearwardly therefrom. Near the passenger side front fender area of the engine compartment, the frame 126 includes a horizontal ledge 128, and a vertical wall 130. Mounting brackets 140 and 142 are welded to the vehicle frame 126 forward of the ledge 128 and extending upwardly therefrom. A pair of upstanding inclined mounting brackets 144 are provided and are welded at their lower, downwardly extending flanges 146 to the vertical sidewall 130 of the frame 126. The upper extremities of the brackets 144 are turned horizontally inward toward the vehicle engine and are apertured with tapped bores to receive the battery tray mounting bolts 66 and 72.

The battery tray 10 is designed to be installed concurrently with the replacement of the automotive vehicle electrical storage battery. The old battery is first removed. The battery mounting tray provided as original equipment with the automotive vehicle 12 is also removed by removing bolts 66–72. The replacement battery tray 10 is positioned in its place in the manner depicted in FIG. 1. That is, the elongated slots 38 and 42 lying closest to the longer side 16 of the battery tray 10 are aligned in registration with corresponding tapped threaded bores in the horizontal surface 128 of the vehicle frame 126. Because of the elongated nature of the slots 38 and 42, registration with the corresponding tapped bores in the vehicle frame 126 will be achieved for most automotive vehicles. The bolts 68 and 70 are then inserted through the slots 38 and 42 respectively to secure the battery tray in position upon the horizontal surface 128 of the frame 126, with the bolts 68 and 70 tightly engaged in the threaded tapped bores in the frame therebeneath. Thereafter, bolts 66 and 72 are similarly engaged in threaded tapped bores in the outwardly directed flanges (not visible) of the brackets 144 that are connected to the vertical side wall 130 of the frame 126. The heads of the bolts 68–72 coact with the solid surface of the floor 14 in the end wells 32 and 34 to hold the battery tray 10 rigidly immobile against the frame 126. As previously noted, the contoured wells 32–36 are sufficiently deep so that the heads of the bolts 66–70 do not protrude above the surrounding surface of the floor 14. A vehicle electrical storage battery can then be positioned on the battery tray 10. The hooks at the lower extremities of fastening poles 62–64 are then inserted into the slots 58 in the tabs 54 clearly visible in FIG. 3. With the battery in position on the floor 14 of the tray 10, rubber gaskets 160 can be installed atop the mounting poles 62 and 64, and a crosswise hold down bar 162 is fitted onto the fastening poles 62 and 64. Wing nuts 170 are then hand tightened downward against the apertured extremities of the hold down bar 162 to draw the hooks of the fastening poles upward against the bearing ledges 60 of the slots 58 to secure the new battery in position relative to the vehicle frame 126.

The battery tray 80 of FIGS. 5–7 is installed in substantially the same way. While with the particular vehicle 12 depicted in FIG. 1 there was no necessity for utilizing the transverse slot 50 in the center well 36 of the battery tray 10, it is sometimes necessary with several different automobile models for this slot to be utilized to receive a fastener for securing the battery tray to the vehicle frame. Similarly, the central apertures 46 and 48 of the embodiment of FIGS. 2–4 are likewise sometimes utilized, depending upon the particular automobile involved.

The particular geometric configurations of fastening slots and apertures provided by the embodiments of the invention depicted enable a battery tray according to the invention to be provided for virtually every commercially significant automotive vehicle storage battery and every commercially significant automotive vehicle in use today. Because of the possible minor variations which can be performed to the embodiments depicted, without detracting significantly from the versatility of the invention, the present invention should not be construed as limited to those specific embodiments depicted in the drawings but rather is defined in the claims appended hereto.

I claim:

1. A battery tray for an automotive vehicle electrical storage battery comprising a solid rectangular floor having longer and shorter sides and upwardly directed retaining lips about the perimeter of said floor and said floor is contoured to form two shallow end wells and a shallow center well spaced longitudinally across said floor along the longer dimension thereof defined as the distance between said shorter sides, said pair of end wells and said center well being spaced apart each from the other for providing a floor portion therebetween to bear the weight of said battery and balance said battery when dynamic loads are applied thereto, and a pair of elongated slots are defined in each of said end wells parallel to said longer floor sides and transversely spaced from each other, and a circular aperture is defined between said elongated slots in each of said end wells, and at least one elongated transverse slot is defined in said center well, and the lips along said longer sides include bearing ledges adapted to receive and secure upright fastening poles.

2. A battery tray according to claim 1 further characterized in that said longer sides of said floor are approximately 275.59 millimeters long and said shorter sides of said floor are approximately 143.33 millimeters long, and a slot in each of said end wells is located approximately 38.1 millimeters from one of said longer sides and another slot in each of said end wells is located approximately 134.62 millimeters from said same side, and said circular apertures in said end wells are located approximately 92.71 millimeters from said same side.

3. A battery tray according to claim 2 further characterized in that said slot in said center well lies in perpendicular alignment to said longer sides of said floor and is centered approximately 92.71 millimeters from said same longer side and approximately 137.92 millimeters from one of said shorter sides of said floor.

4. A battery tray according to claim 3 further characterized in that the slots in each end well are longitudinally offset from each other and are each about 37.59 millimeters in length, and said slots located approximately 38.1 millimeters from the aforesaid same longer side of said floor terminate about 31.62 millimeters from opposite ones of said shorter sides of said floor and said slots located approximately 134.62 millimeters from said same longer side terminate about 46.99 millimeters from said shorter sides of said floor, and said circular apertures in said two end wells are centered approximately 64.77 millimeters from opposite ones of said shorter sides.

5. A battery tray according to claim 1 further characterized in that said longer sides of said floor are approximately 337.82 millimeters long and said shorter sides of said floor are approximately 184.15 millimeters long, and a slot in each of said end wells is centered approximately 41.91 millimeters from one of said longer sides and another slot in each of said end wells is centered approximately 131.06 millimeters from said same side, and said circular apertures in said end walls are located approximately 93.71 millimeters from said same side.

6. A battery tray according to claim 5 further characterized in that two slots are defined in said center well, and a first of said center well slots lies in perpendicular alignment to said longer sides of said floor and extends a distance of about 34.29 millimeters and terminates approximately 24.77 millimeters from said same longer side and is approximately centered between said shorter sides, and a second of said center well slots lies at an angle of approximately 16.75° from perpendicular alignment relative to said longer sides of said floor and extends toward said longer side from a location centered approximately 131.06 millimeters from said same longer side and in alignment with said first center well slot.

7. A battery tray according to claim 6 further characterized in that the slots in each end well are longitudinally aligned with each other and are about 41.99 millimeters in length, and said end well slots closest to the center of said second center well slot terminate about 36.2 millimeters from one of said shorter sides of said floor and said slots in said end well most remote from the center of said second center well slot terminate about 52.71 millimeters from the opposite one of said shorter sides of said floor.

* * * * *

Disclaimer 4,327,809.—*Michael Fenstermaker*, Lynwood, Calif. BATTERY TRAY. Patent dated May 4, 1982. Disclaimer filed Mar. 29, 1989, by the assignee, Mr. Gasket Co.

Hereby enters this disclaimer to the entire term of said patent.

[*Official Gazette May 23, 1989*]